United States Patent Office 3,616,744
Patented Nov. 2, 1971

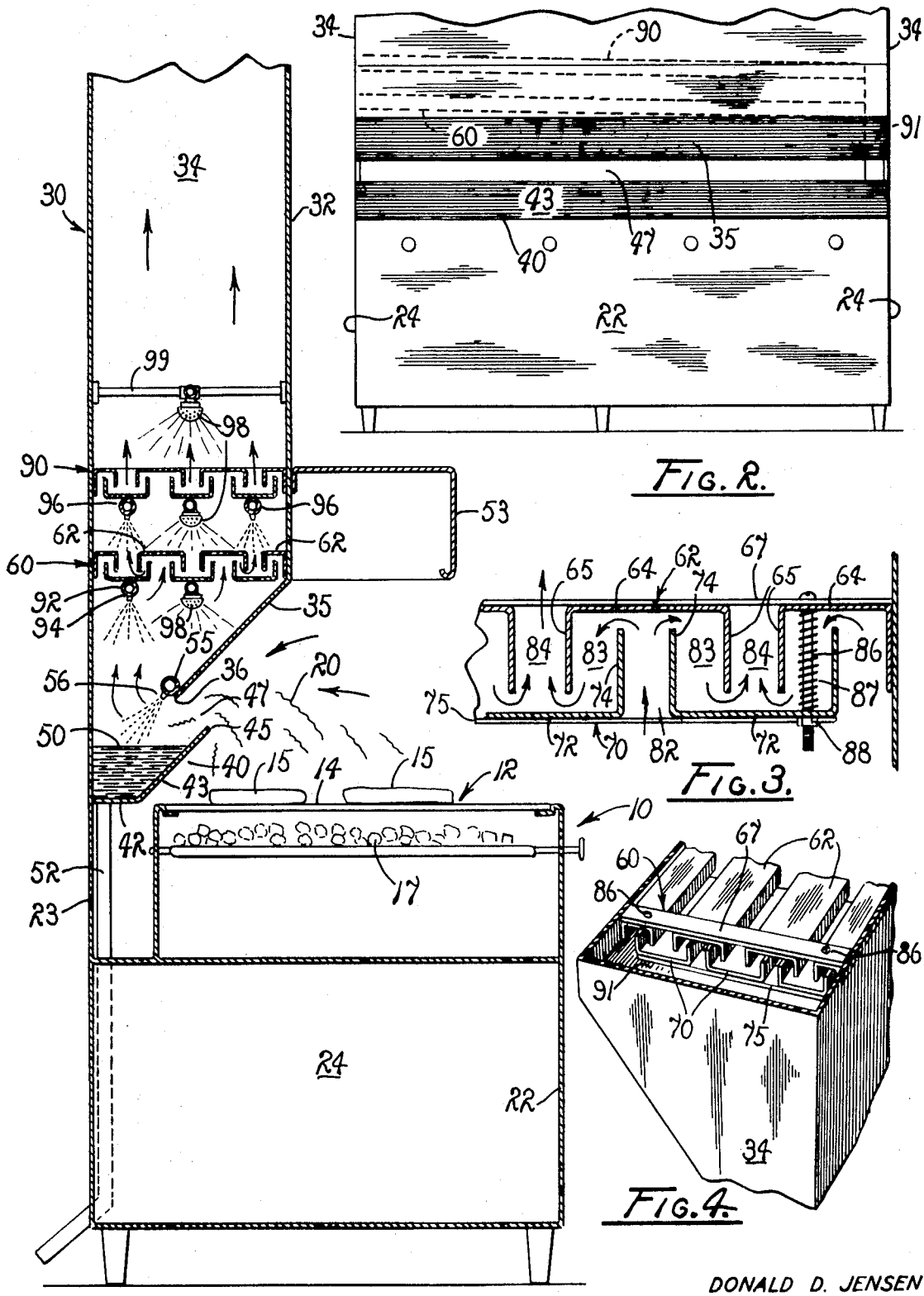

3,616,744
AIR CLEANSING SYSTEM FOR COOKING RANGES
Donald D. Jensen, 3604 E. Butler Ave.,
Fresno, Calif. 93721
Filed Aug. 21, 1969, Ser. No. 852,026
Int. Cl. F23j 11/02
U.S. Cl. 98—115 K                                    6 Claims

ABSTRACT OF THE DISCLOSURE

An air cleansing system, for cooking ranges and the like, adapted to remove heat and contaminants such as grease-laden fumes generated from the heating surfaces of such ranges, providing an exhaust duct extended from a position adjacent to said heating surface at which it has an intake opening to a remote exhaust opening, said duct having a constricted portion near the heating surface, means for drawing fumes in the intake opening for discharge from the exhaust opening, a spray bath located at the constricted portion of the duct, and a pan disposed below the bath to collect spray therefrom together with contaminants dissolved therein. The stream of air generated through the duct is cleansed by the washing action of the spray bath, the cooling effect thereof resulting in condensation of volatile contaminants, and by successive humidification and dehumidification of the stream. The invention also has to do with a unique form of trap having particularly significant utilization in the system.

BACKGROUND OF THE INVENTION

The present invention is a further improvement in the applicant's continuing development of air purification systems particularly adapted for cooking ranges and the like as exemplified by his U.S. Pats. Nos. 3,260,189; 3,292,525; and 3,386,365. These patents generally relate to various systems and methods for cleansing air of airborne contaminants by introducing moisture into an airstream containing gaseous liquid or solid contaminants so that such moisture is intimately entrained with the contaminants. The moisture and contaminants are subsequently condensed out of the airstream by further cooling during passage of the airstream through various refrigerating and mechanical separating filters. The above designated patents have specifically applied such systems to cooking ranges for exhausting and cleansing the grease-laden smoke and fumes emanating from the cooking surfaces of such ranges with substantial commercial success.

In applicant's application Ser. No. 564,381, now abandoned, an air cleansing system was provided in which a curtain of air was blown across the cooking surface which was previously saturated with water vapor and subsequently passed through a mechanical filter immediately above the cooking surface for dehumidification in a bank of dehumidifying baffles and refrigerator coils. The closest prior art cited during the prosecution of this application were the Higgs Pat. No. 2,633,842 and the Vicard Pat. No. 2,579,282. The Higgs reference disclosed an infant incubator which provided a method and apparatus of humidifying air by passing it over a reservoir of water and subsequently lowering the relative humidity by adding dry air to the previously moistened air. This reference, of course, had nothing to do with cleansing the air itself of impurities or the type of contaminants encountered during the operation of fume-generating cooking ranges. The Vicard reference discloses a system for the treatment of gases by the utilization of a venturi tube through which the gas and intermixed water vapor is passed to condense out the particles entrained therein. Such complicated structure would not be readily adaptable to any commercial installation involving the cleansing of air from a cooking range.

The applicant's above designated abandoned application and the air cleansing systems of the prior art have employed mechanical filters in exhaust ducts to remove airborne contaminants. Consequently, the airstreams passing therethrough give up some of their contaminants to the filters with the contaminants quickly accumulating and substantially reducing the efficiency of the filters. If the filters are not frequently changed, such accumulations flow from the filters and create a health and fire hazard. These filters are also unsightly, particularly when the range is located within the dining room of a restaurant and objectionable not only to the customers but also to various health regulatory agencies which periodically inspect such installations. Furthermore, a substantial portion of the vaporized grease which normally passes through mechanical filters is permitted to accumulate on the walls of the exhaust duct, further aggravating the fire hazard. Various damper structures have been employed in the exhaust ducts to starve a fire occurring in the stack of oxygen, but these require somewhat complicated controls which, in the past, have not been as dependable as required to insure complete safety. Accordingly, it is highly desirable to eliminate such complicated damper systems and to remove the conventional mechanical filters from their usual locations immediately above the cooking surfaces of ranges so as virtually to eliminate the fire hazard from such installations. Such disadvantages are believed successfully overcome by the structure of the present invention which completely eliminates the conventional filter pads and which insures that there is virtually no opportunity for the accumulation of grease and the like from the cooking surface of the range within the exhaust duct.

SUMMARY OF THE INVENTION

It is therefore an object of the present invention to provide an improved air cleansing system for cooking ranges and the like.

Another object is to provide an improved air cleansing system which virtually eliminates the fire hazard attendant to such installations.

Another object is to achieve effective air cleansing without the use of filters.

Another object is to provide such an improved air cleansing system which eliminates the need for complicated and expensive damper systems in the exhaust ducts by substantially confining all potential fires to the cooking surfaces of the ranges.

Another object is to provide an improved air cleansing system for ranges and the like which is of such improved effectiveness that the cleansed air can be discharged back into a restaurant, kitchen, dining room or the like.

Another object is to provide an improved air cleansing system of the character described which is capable of creating a strong airstream to draw substantially all the cooking fumes, odors and the like from the cooking surfaces of ranges inwardly of the exhaust ducts as a booster to room exhaust fans, blowers or the like.

Another object is to provide an improved air cleansing system which employs an exhaust duct adjacent to a cooking surface and having a constricted opening with a plurality of high density fogging water vapor nozzles disposed therein dependably to aid in drawing substantially all of the cooking fumes into the exhaust duct.

Another object is to provide an improved air cleansing system wherein the airstream is passed through the initial fogging section partially to saturate the airstream and to propel the contaminants into a water bath for collection and discharge therefrom prior to further travel upwardly through the exhaust duct.

Another object is to provide such an improved air cleansing system which employs fogging sections in combination with tortuous mechanical baffle sections to dehumidify the airstream and to remove virtually all the contaminant particles therefrom prior to discharge from the duct.

Other objects and advantages of the present invention will subsequently become more clearly apparent upon reference to the following description and accompanying drawing.

BRIEF DESCRIPTION OF THE DRAWING

FIG. 1 is a vertical transverse section, taken centrally through a cooking range and exhaust duct therefor incorporating the principles of the present invention.

FIG. 2 is a somewhat reduced front elevation of the range and exhaust duct of FIG. 1.

FIG. 3 is a somewhat enlarged fragmentary transverse vertical section through the dehumidifying baffles within the exhaust duct.

FIG. 4 is a somewhat enlarged fragmentary perspective of the baffles of FIG. 3.

DESCRIPTION OF THE PREFERRED EMBODIMENT

Referring more particularly to the drawing, an air cleansing system embodying the principles of the present invention is shown associated with a cooking range, generally indicated by the reference numeral 10. The range has a grill 12 providing an upper cooking surface 14 which is adapted to receive thereon articles of food to be cooked such as that indicated by the reference numeral 15. A source of thermal energy 17 is disposed below the grill for elevating the temperature of the grill to the desired level by the transfer of heat energy in the known manner. As is well-known, various forms of cooking oils and the like, as well as fats and other materials in the food itself, generate fumes during cooking in the form of grease vapors, water vapors, odors, smoke and the like, as illustrated at 20 in FIG. 1.

The range 10 includes forward and rearward walls 22 and 23, respectively, and opposite end walls 24. The rear wall 23 is upwardly extended a predetermined distance above the cooking surface 14 of the grill 12 with the rearward edge of the grill being spaced a predetermined distance from the rear wall of the range. A substantially upright air exhaust duct 30 is mounted on the rearward wall 23 of the range in upwardly spaced relation from the grill 12. The air exhaust duct provides a forward wall 32 disposed in spaced substantially parallel relation to the rear wall 23 of the range and opposite side walls 34. The forward wall has a lower angularly disposed deflector portion 35 extended toward the rearward wall of the grill which terminates in a lower edge 36 disposed in spaced substantially parallel relation to the rearward wall of the grill. Although the exhaust 30 is illustrated as extending upwardly, as is its most common disposition, it can be extended in any direction desired and air forced or drawn therethrough by any suitable means.

An elongated pan 40 is mounted on the rearward wall 23 of the range 10 below the air exhaust duct 30 and adjacent to the rearward edge of the grill 12. The pan has a lower wall 42 and an angularly upwardly extended forward wall 43 disposed in a plane substantially parallel to the lower deflector portion 35 of the exhaust duct. The forward wall of the pan terminates in an upper edge 45 which is coextensively related in spaced substantially parallel relation to the lower edge 36 of the deflector portion 35 to define a constricted opening 47 therebetween into the air exhaust duct 30. The pan contains a water bath 50 maintained at a predetermined level somewhat below the upper edge 45 of the forward wall 43. As will subsequently be described, the pan receives spray and spray-borne contaminants which precipitate from the duct. A drain conduit 52 is downwardly extended from the lower wall 42 for connection to a sewer line or the like, also not shown. An elongated hood 53 is mounted on the forward wall 22 in overhanging relation to the grill 12 to trap and to divert any drifting fumes and smoke downwardly into the constricted opening 47 of the air exhaust duct.

An elongated water supply conduit 55 is disposed inwardly along the lower edge 36 of the air exhaust duct 30 and is connected to a suitable supply of water under pressure, not shown. The supply conduit has a plurality of longitudinally spaced fogging nozzles 56 thereon for discharging a fine mist of water droplets in a widely diverging pattern. The water vapor or fog from the nozzles is directed downwardly toward the surface of the water bath 50 to agitate it and to provide a relatively low pressure area within the air exhaust duct 30. The low pressure is further insured by a venturi effect produced in the constricted opening 47 by the air being forcibly drawn therethrough by an exhaust fan, not shown, in the duct 30. This causes the fumes 20 emanating from the cooking surface 14 to be positively drawn inwardly of the exhaust duct.

A first air dehumidifying and contaminant collecting baffle or trap 60 is mounted within the air exhaust duct 30 in predetermined spaced relation above the fogging nozzles 56. The baffle provides a plurality of longitudinally extended spaced substantially parallel upper channel-shaped members 62 disposed in an inverted position to provide substantially horizontal portions 64 and opposite depending leg portions 65. The legs of the outermost channel-shaped members are respectively secured to the forward and rearward walls of the air exhaust duct, as by spot welding or the like, with the innermost channel-shaped members being supported thereon by transversely disposed longitudinally spaced straps 67.

A set of lower channel-shaped members 70 is supported in depending relation from the upper channel-shaped members 62 in intermeshed elevationally adjustable relation. The lower channel-shaped members provide horizontal portions 72 and upstanding opposite legs 74. As best shown in FIG. 3, the lower channel-shaped members are constrained by a plurality of transversely extended, longitudinally spaced straps 75 with the opposite legs 55 of the upper channel-shaped members extending downwardly into the lower channel-shaped members and into the space between the adjacent lower channel-shaped members. Accordingly, a plurality of tortuous air passages 80 are provided through each of the adjacent upper and lower channel-shaped members which have lower entry portions 82, intermediate portions 83 between the adjacent legs of the upper and lower channel-shaped members, and discharge portions 84. The lower channel-shaped members 70 are elevationally adjustably held in their described positions by a plurality of elongated hanger bolts 86 each having a compression spring 87 disposed thereabout between the adjacent horizontal portions 64 and 72 of the channel-shaped members to provide a force tending to separate the upper and lower channel-shaped members to a desired spacing, as determined by the axial location of an adjusting nut 88 on the lower end of each of the hanger bolts 86. The channel-shaped members are preferably positioned to achieve substantially even air distribution. By tightening and loosening the nuts 88, the effective extent of constriction of the duct can be regulated and the resultant venturi effect regulated.

A second-stage baffle 90 substantially identical to the first-stage or lower baffle 60, is disposed in elevationally spaced relation thereabove within the air exhaust duct 30. Inasmuch as the structure is identical, the same reference numerals are applied to the upper and lower channel-shaped members of the upper baffle as in the first-stage or lower baffle 60.

As best shown in FIG. 2 of the drawing, the baffles 60 and 90 are longitudinally sloped from left to right with the right-hand ends thereof terminating short of the adjacent side wall 34 of the air exhaust duct 30. This provides a space or discharge passage 91 through which the accumulated water and contaminants which are collected in the lower channel-shaped members 70 can drain and gravitate downwardly into the water bath 50.

An elongated water supply conduit 92 is secured along the lower surface of the lower channel-shaped member 62 of the first-stage baffle 60 nearest to the rearward wall 23 of the range. A plurality of fogging nozzles 94, which are identical to the fogging nozzles 56, are downwardly extended from the supply conduit to discharge a fogging spray of water vapor toward the water bath 50. A pair of substantially identical fogging nozzles and supply conduit assemblies 96 are mounted below the outermost lower channel-shaped members 70 of the second-stage or upper baffle 90 to provide a third fogging stage between the lower and upper baffles 60 and 90.

A set of three duct washing spray nozzles assemblies 98 is disposed within the air exhaust duct 30 for cleaning the duct after each shift of operation of the grill 12 and as an added precaution in case of fire. The first set of washing nozzles is disposed beneath the first baffle 60, the second set of washing nozzles is disposed beneath the second or upper baffle 90, and the third set of washing nozzles is disposed in elevationally spaced relation to the upper baffle and is supported on a transversely extended rod 99 with all connected to a common source of water under pressure. It is also recognized that a suitable thermostatically controlled system can be employed within the air exhaust duct automatically to actuate the washing supply nozzles in the event the temperature in the duct is elevated above the desired limits by virtue of a fire or the like therein. Although each fog nozzle preferably has a capacity of about one gallon of water per hour, an effective fire extinguishing fog is produced.

OPERATION

The operation of the described embodiment of the subject invention is believed to be clearly apparent and is briefly summarized at this point. As previously described, during the cooking operation, the fumes 20 emanating from the articles of food 15 upon the cooking surface 14 of the grill 12 are drawn into the duct 30 by the exhaust fan, not shown, toward the deflector portion 35. Of course, the fumes may be drawn in by convection if a duct of sufficient height is utilized. The fogging mist discharged from the fogging nozzles 56 along the inner lower edge 36 of the exhaust duct together with the venturi action create a low pressure area within the duct inwardly adjacent to the constricted opening 47. Hot cooking fumes bearing the contaminants such as grease, fats and the like are drawn into the first-stage fogging area. The airstream is partially saturated by the minute water droplets in the fogging spray which absorb the contaminants and descend into the water bath 50 disposed below the constricted opening 47. This causes the contaminants to settle on the water, which is continually agitated by the spray from the fogging nozzles. The heat absorbed by vaporization of the droplets has a substantial cooling effect on the fat fumes causing effective condensation of grease and fat fumes. A substantial portion of the grease trapped by the water bath also collects along the sides of the pan 40 which, by virtue of the water bath being continually agitated, is mixed with the water and air to cause such grease to hydrolyze into a glycerine-like mass. In such form, the grease quickly breaks away from the sides of the pan and is also discharged downwardly through the drain conduit 52 with the other contaminants.

The upwardly directed convection currents of the still warm airstream pass upwardly from the water bath still containing some minute particles of contaminants intimately entrained with the airstream which have become partially saturated with the water vapor from the first-stage fogging nozzles 56. As the airstream moves upwardly, it immediately encounters the second-stage fogging vapor from the second-stage fogging nozzles 94 beneath the baffle 60 where it receives a second washing action. The airstream then passes upwardly through the inlet portions of the passages 80 through the first-stage baffle 60 which is continually cooled from above by the third-stage fogging assemblies 96.

The airstream is divided for upward passage through the several inlet portions 82 of the passage 80 which is deflected downwardly by the upper channel-shaped members through the intermediate portions 83 of the passages and thence upwardly through the discharge portions 84 thereof. During such passage of the airstream through the first-stage baffle 60, substantial dehumidification of the air occurs and the remaining particles of contaminants are substantially completely removed. Furthermore, substantially all of the impurities are removed from the airstream by the dynamic impact of the water vapor and contaminants during their upward passage through the tortuous baffle structure. As described and as best shown in FIG. 2 of the drawing, the baffles are longitudinally sloped from left to right with the right-hand end thereof terminating short of the side wall 34 of air exhaust duct 30 to provide the discharge passage 91 through which the accumulated water and contaminants can drain and gravitate downwardly into the water bath 50.

The cleansing phenomena of the baffles is due to several effects. The successive sharp reversal of air movement has a mild centrifuging effect tending to throw water droplets and contaminants therefrom for collection on and drainage from the baffles. The main airstream through the duct is temporarily dispersed into a multiplicity of small streams aiding in heat dissipation and condensation of water, fat and grease vapors. The aggregate cross sectional areas of the passages through the baffles is less than that of the duct causing a venturi effect, a reduction in pressure and a decreased air transporting ability.

It is further noted that the upper and lower channel-shaped members 62 and 70 of the baffles are elevationally adjustable relative to each other in order precisely to regulate the volume of air flowing therethrough. Accordingly, the baffle is able to operate at the point of greatest efficiency which further serves to permit the airstream through the baffle to be equalized along its entire length. The airstream which has now been virtually cleansed of all contaminants travels upwardly by convection through the second-stage baffle 90 in the same manner as that previously described during its passage through the first-stage baffle 60. During such passage of the airstream through the second-stage baffle, the airstream is further dehumidified and virtually all the remaining moisture is collected in the lower channel-shaped members thereof for gravitational descent to the right, as viewed in FIG. 2, and downwardly through the discharge passage to the water bath 50. The cleansed airstream then continues upwardly for discharge outwardly of the building or for recirculation within the same room as the range 10 is located, if desired.

In view of the foregoing, it is readily apparent that the structure of the present invention provides an improved air cleansing system particularly adapted for cooking ranges and the like which is conveniently disposed within the air discharge duct upwardly extended from the cooking surface of the range. The baffle system of the present invention is virtually self-cleaning and requires only a minimum of attention during operation. The system eliminates all significant accumulation of combustible material within the duct thereby substantially eliminating all fire hazard within the duct or adjacent to the cooking surface of the range. It is further significant that the major portion of the contaminants within the airstream from the cooking surface is trapped within the water bath for passage downwardly through the drain conduit 52 and away from the cooking area.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An air cleansing system comprising an exhaust duct adapted to be extended from a position adjacent to a heating surface from which contaminant laden fumes are normally generated; means creating an airstream within said duct to draw the fumes emanating from such a heating surface inwardly into the duct; fog nozzles means disposed in said duct capable of producing a relatively dense cloud of water vapor therein providing minute droplets substantially to saturate said airstream in contaminant entraining relation; means for supplying water under pressure to said nozzles; drainage means disposed to receive said contaminant entrained cloud of water vapor from said nozzles, said fog nozzles means being mounted within the duct above the drainage means to direct said cloud of water vapor toward said drainage means through fumes drawn through the duct, said airstream being directed upwardly within the duct and said fog nozzles being disposed within the duct in elevationally spaced relation; and dehumidifying means disposed within said exhaust duct between said elevationally spaced fog nozzles providing a tortuous path of travel for said airstream upwardly through the duct providing sufficient dynamic impact upon said entrained contaminants and water vapor to remove them from the airstream and to trap them therein for separate discharge from the duct.

2. The air cleansing system of claim 1 wherein said dehumidfying means includes a drain for discharging accumulated water and contaminants downwardly into said drainage means.

3. The air cleansing system of claim 2 in which said dehumidifying means comprises an elongated baffle having a plurality of substantially identical longitudinally extended laterally spaced channel-shaped members individually providing oppositely spaced substantially parallel side walls interconnected by an intermediate substantially horizontal wall right angularly related to said side walls with the channel-shaped members arranged in upper and lower inverted intermeshed rows with the spaces between the side walls of the channel-shaped members of the lower row providing a plurality of air inlet passages for said airstream, intermediate passages between the adjacent side walls of said intermeshed upper and lower rows of channel-shaped members, and a plurality of air outlet passages formed between the adjacent side walls of the channel-shaped members in the upper row so that the path of travel of the airstream is abruptly changed several times as it passes through the tortous path afforded by said passages in the baffle wherein said contaminants therein are dynamically separated from the airstream and collected within the baffle.

4. The air cleansing system of claim 3 in which the channel-shaped members are disposed adjacent to the fog nozzles to receive spray therefrom whereby they are cooled for more effective cleansing action and rinsed by condensation thereon.

5. In an air cleansing system having an air duct; a plurality of substantially parallel upright channel-shaped members mounted transversely in the duct; a plurality of substantially parallel inverted channel-shaped members mounted transversely in the duct in intermeshed relation with the upright channel-shaped members, the adjacent upright channel-shaped members having spaced side walls extended upwardly into respective inverted channel-shaped members and the adjacent inverted channel-shaped members having spaced side walls extended downwardly into respective inverted channel-shaped members to define a plurality of circuitous relatively abrupztly direction changing air paths therethrough; fog nozzle means disposed adjacent to the channel-shaped members; and means for supplying water under pressure to the nozzle means whereby water is discharged onto the channel-shaped members to cool and rinse the same.

6. In the cleansing system of claim 5, means mounting the channel-shaped members in longitudinally inclined attitudes for drainage purposes, and means for collecting drainage from the channel-shaped members.

References Cited

UNITED STATES PATENTS

| | | | |
|---|---|---|---|
| 2,539,344 | 1/1951 | Carraway | 98—115 K X |
| 2,678,199 | 5/1954 | Koch | 261—113 X |
| 2,708,981 | 5/1955 | Armalost et al. | 55—255 X |
| 3,021,777 | 2/1962 | Smith | 98—115 K |
| 3,207,058 | 9/1965 | Gaylord | 98—115 K |
| 3,324,629 | 6/1967 | Graswich et al. | 98—115 K X |
| 3,410,195 | 11/1968 | King | 98—115 K |
| 3,433,146 | 3/1969 | Russell | 98—115 K |
| 3,459,115 | 8/1969 | Gutermuth | 98—115 K X |
| 3,490,206 | 1/1970 | Doane | 98—115 K X |

MEYER PERLIN, Primary Examiner

W. C. ANDERSON, Assistant Examiner

U.S. Cl. X.R.

55—255